United States Patent
Jöngren et al.

(10) Patent No.: US 10,673,497 B2
(45) Date of Patent: *Jun. 2, 2020

(54) METHOD AND ARRANGEMENTS IN A TELECOMMUNICATION SYSTEM

(71) Applicant: Unwired Planet, LLC, Plano, TX (US)

(72) Inventors: George Jöngren, Stockholm (SE); Bo Göransson, Sollentuna (SE); Lei Wan, Beijing (CN)

(73) Assignee: Unwired Planet, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,009

(22) Filed: Jul. 26, 2018

(65) Prior Publication Data

US 2018/0331734 A1 Nov. 15, 2018

Related U.S. Application Data

(63) Continuation of application No. 15/616,964, filed on Jun. 8, 2017, now Pat. No. 10,056,953, which is a (Continued)

(30) Foreign Application Priority Data

Jun. 27, 2007 (SE) ..................................... 0701582

(51) Int. Cl.
*H04B 7/0452* (2017.01)
*H04B 7/06* (2006.01)
(Continued)

(52) U.S. Cl.
CPC ......... *H04B 7/0452* (2013.01); *H04B 7/0486* (2013.01); *H04B 7/0689* (2013.01);
(Continued)

(58) Field of Classification Search
None
See application file for complete search history.

(56) References Cited

U.S. PATENT DOCUMENTS 6,944,075 B1 9/2005 Eustis et al.
8,351,530 B2 1/2013 Pan et al.
(Continued)

FOREIGN PATENT DOCUMENTS

JP 2007251924 9/2007
JP 2008532414 8/2008
(Continued)

OTHER PUBLICATIONS

U.S. Appl. No. 15/616,964, filed Jun. 8, 2017, Inventor: Jongren et al.
(Continued)

*Primary Examiner* — Rebecca E Song
(74) *Attorney, Agent, or Firm* — Nixon & Vanderhye P.C.

(57) ABSTRACT

Methods and arrangements are described for Multi User Multiple-Input-Multiple-Output (MU-MIMO) signaling via Multiple-Input-Multiple-Output (MIMO) antennas between a base station and one of a plurality of mobile terminals supporting both Single User and Multi User Multiple-Input-Multiple-Output (SU-MIMO and MU-MIMO) signaling modes. Switching between the modes is supported, and the modes have partly shared signaling. SU-MIMO mode signaling which is not needed for MU-MIMO mode signaling is identified. Data bits of the identified signaling is interpreted to comprise signaling information associated with MU-MIMO mode.

28 Claims, 6 Drawing Sheets

Related U.S. Application Data continuation of application No. 14/636,124, filed on Mar. 2, 2015, now Pat. No. 9,698,879, which is a continuation of application No. 12/666,115, filed as application No. PCT/SE2008/050383 on Apr. 3, 2008, now Pat. No. 8,989,290.

(51) Int. Cl.

| | | |
|---|---|---|
| *H04B 7/0456* | (2017.01) | |
| *H04L 5/00* | (2006.01) | |
| *H04W 52/36* | (2009.01) | |
| *H04W 72/04* | (2009.01) | |
| *H04W 52/54* | (2009.01) | |
| *H04W 88/06* | (2009.01) | |
| *H04W 88/10* | (2009.01) | |

(52) U.S. Cl.
CPC .......... *H04L 5/0048* (2013.01); *H04W 52/36* (2013.01); *H04W 72/042* (2013.01); *H04B 7/0469* (2013.01); *H04W 52/54* (2013.01); *H04W 88/06* (2013.01); *H04W 88/10* (2013.01)

(56) References Cited

U.S. PATENT DOCUMENTS

| | | | |
|---|---|---|---|
| 8,989,290 B2 | 3/2015 | Jongren et al. | |
| 9,698,879 B2 | 7/2017 | Jongren et al. | |
| 2006/0251156 A1 | 11/2006 | Grant et al. | |
| 2007/0223422 A1 | 9/2007 | Kim et al. | |
| 2007/0270173 A1* | 11/2007 | Niu | H04B 7/0413 455/522 |
| 2008/0080635 A1* | 4/2008 | Hugl | H04L 1/0028 375/267 |
| 2008/0212701 A1 | 9/2008 | Pan et al. | |
| 2008/0260059 A1 | 10/2008 | Pan | |
| 2010/0091743 A1 | 4/2010 | Kazmi et al. | |
| 2010/0296591 A1* | 11/2010 | Xu | H04B 7/0613 375/259 |
| 2010/0303052 A1 | 12/2010 | Visuri et al. | |
| 2011/0122971 A1 | 5/2011 | Kim et al. | |
| 2012/0033756 A1 | 2/2012 | Khojastepour et al. | |
| 2012/0140850 A1 | 6/2012 | Khojastepour et al. | |

FOREIGN PATENT DOCUMENTS

| | | |
|---|---|---|
| JP | 2010508782 | 3/2010 |
| JP | 2010516129 | 5/2010 |
| JP | 2010525684 | 7/2010 |
| WO | WO2005/122485 | 12/2005 |

OTHER PUBLICATIONS

3GPP R1-063130 "System level comparison between MU- and SU—MIMO for downlink precoding systems with four transmit antennas" Ericsson, TSG-RAN WG1 #47, Nov. 2006, 4 pages.

3GPP R1-072464, "MU-MIMO for E-UTRA DL" Ericsson, TSG-RAN WG1 #49, May 2007, 2 pages.

3GPP R1-071510 "Details of Zero-Forcing MU-MIMO for DL E-UTRA" Freescale Semiconductor Inc. TSG RAN WG1 #48bis, Mar. 2007, 6 pages.

3GPP R1-060335, "Downlink MIMO for EUTRA" Samsung TSG-RAN wG1 #44, Feb. 2006, 10 pages.

LG Electronics "On the consideration of DL L1/L2 control channel design for MIMO" R1-072344, GPP, May 7, 2007, URL http://3gpp.org/ftp/tsg_ran/WG1_RL1/TSGR1_49/Docs/R1-072344.zip.

3GPP TS 36.211 V1.1.1, V8.1.0 "Physical Channels and Modulation" Release 8, Nov. 2007, 54 pages.

3GPP R1-072843 "Way Forward on 4-Tx Antenna Codebook for SU-MIMO" Texas Instruments et al TSG RAN WG1 #49bis, Jun. 2007, 4 pages.

3GPP R1-073095 "Way-Forward on Codebook for SU-MIMO Precoding" Samsung, TSG RAN WG1 #49bis, Jun. 2007, 20 pages.

GPP TSG RAN WG1 Meeting #48bis, R1-071569 (Samsung) Mar. 26, 2007 3rd Generation Partnership Project "Downlink Signaling for Support of Single-User MIMO" 3GPP TSG RAN WG1 Meeting #48bis, R1-071569, st. Julian's, Malta, Mar. 26-30, 2007, 3 pages.

3GPP TSG RAN WG1 Meeting #46bis, R1-062525 (Samsung) Oct. 9, 2006 3rd Generation Partnership Project "Dynamic Mode Switching between Single and Multi-User MIMO" 3GPP TSG RAN WG1 Meeting #46bis, R1-062525, Seoul, Korea, Oct. 9-13, 2006, 4 pages.

International Search Report and Written Opinion dated Dec. 9, 2008 for related PCT/SE2008/050383 filed Mar. 4, 2008, 5 pages.

International Preliminary Report on Patentability dated Aug. 26, 2009 for related application PCT/SE2008/050383 filed Mar. 4, 2008, 5 pages.

3GPP TS 25.212 V7.4.0, Mar. 22, 2007, 102 pages.

3GPP TS 25.321 V7.3.0, Dec. 21, 2006, 113 pages.

R. L. Choi, M. T. Ivrlac, R. D. Murch and W. Utschick, "On strategies of multiuser MIMO transmit signal processing," IEEE Transactions on Wireless Communications, vol. 3, No. 6, pp. 1936-1941, Nov. 2004, 6 pages.

Philips, R1-062483, 3GPP TSG RAN WG1 #46bis, "Comparison between MU-MIMO codebook-based channel reporting techniques for LTE downlink", Oct. 2006, 10 pages.

Freescale Semiconductor Inc., R1-070222, 3GPP TSG RAN WG1 Meeting #47bis, "Aspects of SU/MU Switching and MU-MIMO in DL EUTRA", Jan. 2007, 4 pages.

U.S. Appl. No. 60/890,201, filed Feb. 16, 2007 (provisional to 8,351,530), PAn et al, 11 pages.

U.S. Appl. No. 60/890,311, filed Feb. 16, 2007 (provisional to 8,351,530), PAN et al, 13 pages.

"Draft Report of 3GPP TSG RAN WG1#49b", R1-073815, Jun. 1, 2007 (Jun. 1, 2007), XP008131769, p. 26, paragraph 1-p. 27, paragraph 1.

* cited by examiner

40: Bits reserved for SU-MIMO mode

41: Bits necessary for 2 Tx correlated SDMA in MU-MIMO mode

42: Redundant bit for 2 Tx MU-MIMO mode

METHOD AND ARRANGEMENTS IN A TELECOMMUNICATION SYSTEM

CROSS-REFERENCE TO RELATED APPLICATIONS

The application is a continuation of U.S. patent application Ser. No. 15/616,964, filed Jun. 8, 2017, which is a continuation of U.S. patent application Ser. No. 14/636,124, filed Mar. 2, 2015 (now U.S. Pat. No. 9,698,879), which is a continuation of U.S. patent application Ser. No. 12/666,115, filed Jul. 2, 2010 (now U.S. Pat. No. 8,989,290), which is a U.S. national stage entry under 35 U.S.C. § 371 of International Application No. PCT/SE2008/050383, filed Apr. 3, 2008 (and published on Dec. 31, 2008 in English by the International Bureau as International Publication No. WO 2009/002251), which claims priority to Swedish Application No. 0701582-9, filed Jun. 27, 2007. The entire contents of each of the above-referenced patent applications are hereby incorporated by reference.

BACKGROUND

The present invention relates to a method and arrangements in a telecommunication system. In particular it relates to a method and arrangements for Multi User Multiple-Input-Multiple-Output signaling in the telecommunication system.

Figure 1:
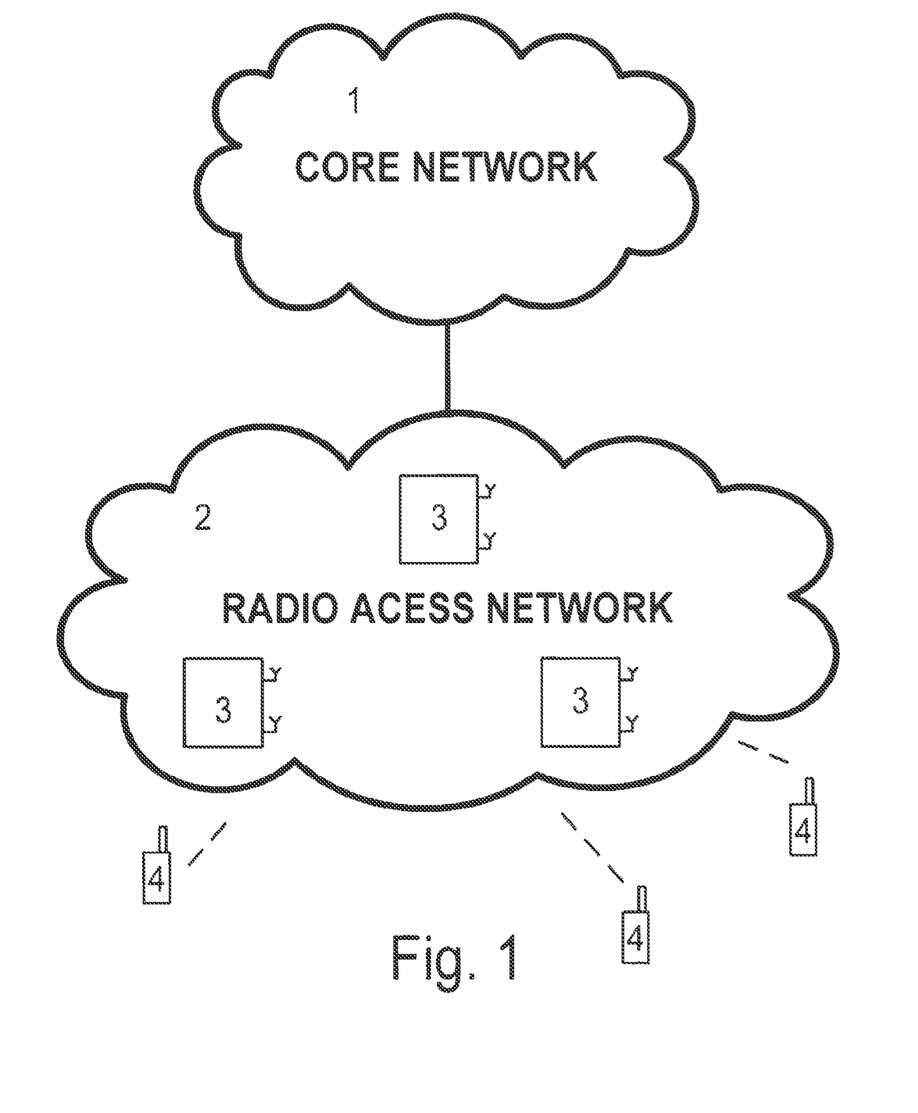
FIG. 1 illustrates a cellular telecommunication system wherein the present invention may be implemented.
Figure 2:
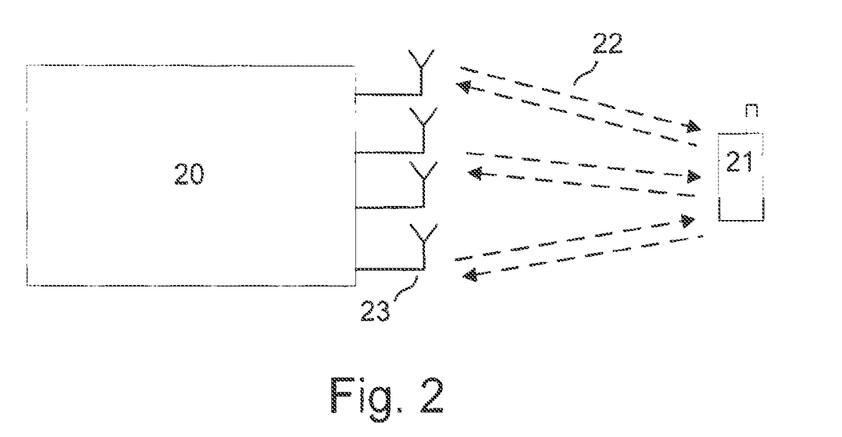
FIG. 2 illustrates a base station operating in SU-MIMO mode.

In the cellular telecommunication system which typically comprises, as illustrated in FIG. 1, a core network 1, a radio access network 2, User Equipments (UEs) 4 and base stations 3 multiple transmit antennas can be used for achieving high data rates in various ways. A multiple-input-multiple-output (MIMO) channel is formed if the receiver also has multiple antennas. One application in such a setup is to strive for high peak rates to a single user. By transmitting on several layers, i.e., wherein the information is transmitted on several bit streams the information is spread in the spatial domain, and substantial improvement in data rate can be achieved under favorable channel conditions. This is called single user MIMO (SU-MIMO) since the data on several layers is intended for a single receiver/user/UE/terminal. FIG. 2 shows an example of a base station 20, with multiple transmit antennas 23, that is transmitting in SU-MIMO mode to a single UE 21. As shown in FIG. 2 several layers 22 are transmitted to a single UE 21. In FIG. 2 the UE is also transmitting to the base station 20 using several layers. The telecommunication system may be an LTE-system which is an evolution of the UMTS.

Figure 3:
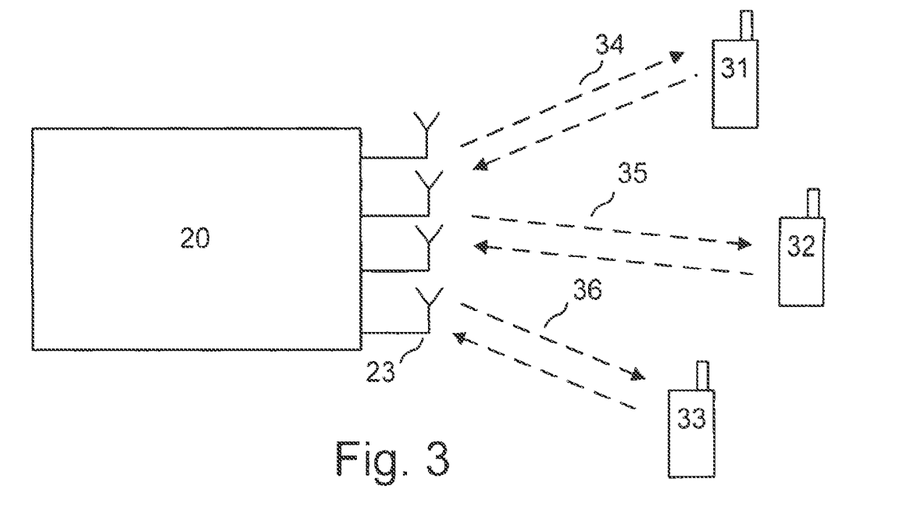
FIG. 3 illustrates a base station operating in MU-MIMO mode.

The number of simultaneously transmitted layers depends highly on the properties of the MIMO channel. Because of, for example fading, usually the MIMO channel does not support more than one layer transmission to a single UE. This limits the data rate and means that spatial multiplexing gain is not possible. To still reach high system capacity it might be beneficial to transmit only a limited number of layers to a single user and instead schedule several users on the same physical resource (e.g. time-frequency-code tile) and use the spatial domain (layers) to separate the users. In essence, layers belonging to different users are transmitted on the same physical resource. Even if the channel to a particular user is such that it does not support multiple layers, which means that it is not possible to transmit multiple layers to that particular user, spatial multiplexing gain on a system level can be achieved as long as the user can efficiently suppress the layers transmitted to the other users. This technique is sometimes referred to as multi-user MIMO (MU-MIMO) and is especially attractive in high load scenarios with many active users as described in 3GPP R1-063130, "System level comparison between MU- and SU-MIMO for downlink precoding systems with four transmit antennas", Ericsson. TSG-RAN WG I #47, November 2006. FIG. 3 shows an example of a base station 20, with multiple transmit antennas 23, that is transmitting in MU-MIMO mode to multiple UEs 31, 32 and 33. As shown in FIG. 3, different layer 34, 35 and 36 is transmitted to each UE 31, 32 and 33. As illustrated in FIG. 3, each UE is also transmitting to the base station 20 using different layers.

In the Long Term Evolution (LTE) standardization process, there is agreement on the support of SU-MIMO and MU-MIMO in the downlink and that there will be the possibility to semi-statically switch between these two modes. Each UE (user/receiver) can in the MU-MIMO mode receive zero or one layer. There are basically three proposals for MU-MIMO support under discussion:

1. Classical space-division multiple access (SDMA) for correlated antenna array setups described in 3GPP R1-072464, "MU-MIMO for E-UTRA DL", Ericsson, TSG-RAN WG1 #49, May 2007.
2. Zero-forcing beamforming described in 3GPP R1-071510, "Details of Zero-Forcing MU-MIMO for DL E-UTRA", Freescale Semiconductor Inc., TSG RAN WG 1 #48bis, March 2007.
3. Per user unitary rate control (PU2RC) described in 3GPP R1-060335, "Downlink MIMO for EUTRA", Samsung, TSG RAN WG1 #44, February 2006.

It has not yet been decided which scheme to support and many remaining details of the standardization of MU-MIMO are hence lacking. One problem that occurs regardless of MU-MIMO mode is how the UE is to know the power offset between a power reference, for instance reference symbols (RS), and data symbols transmitted to the UE. The base station has a certain transmit power of which a certain amount is used to transmit data symbols to a particular UE. The power offset indicates how much power is used to transmit the data symbols in relation to the power reference. This power offset is needed in order to support efficient demodulation in the UE when higher order modulation alphabets like 16 QAM or other higher order modulation schemes are used. The power offset can vary dynamically because of different power settings at the base station (also referred to as Node B or eNode B). In case of MU-MIMO, the power offset can however also fluctuate because of a varying number of multiplexed UEs on the same physical resource. The available transmission power may for example be equally divided among UEs scheduled on different layers in the MU-MIMO mode, meaning less power per UE when several UEs are multiplexed.

SUMMARY

It is therefore an object of the present invention to provide an improved solution for MU-MIMO signaling in a telecommunication system for obviating at least some of the above mentioned problems. The inventive solution to this end intends to enable reuse of SU-MIMO functionality as much as possible in order to support MU-MIMO operation and to reinterpret any signaling in SU-MIMO mode that is not needed for MU-MIMO.

More specifically a first aspect of the present invention relates to a method for Multi User Multiple-Input-Multiple-Output (MU-MIMO) signaling from Multiple-Input-Multiple-Output MIMO antennas of a base station to one of a plurality of mobile terminals of a communication system, where the mobile terminal is configured for both Single User and Multi User Multiple-Input-Multiple-Output (SU-MIMO and MU-MIMO) signaling modes. The mobile terminal is also configured to switch between the modes, wherein the modes have partly shared signaling. A first step of the method comprises identifying SU-MIMO signaling, which is redundant for the MU-MIMO mode. A second step in the method comprises reinterpreting bits of the redundant signaling to comprise signaling information, associated with MU-MIMO mode. A third step in the method is to inform the UE via signaling about the reinterpretation of the redundant bits. The method further comprises a fourth step of signaling information associated with MU-MIMO mode by using the reinterpreted redundant bits.

A second aspect of the present invention relates to a radio base station in a communication system comprising Multiple-Input-Multiple-Output (MIMO) antennas for signaling to one of a plurality of mobile terminals and configured to both Single User and Multi User Multiple-Input-Multiple-Output (SU-MIMO and MU-MIMO) signaling modes, where the base station comprises means for switching between the modes. The modes having partly shared signaling and the base station further comprises, a signaling mode comparator means for identifying, SU-MIMO mode signaling which is redundant for MU-MIMO mode. A reinterpreting means is also present for reinterpreting bits of the redundant signaling to comprise signaling information, associated with MU-MIMO mode. Further means in the base station is a transmitter means for informing via signaling to the UE about the reinterpretation of the redundant bits and signaling information associated with MU-MIMO mode by using the reinterpreted redundant bits.

A third aspect of the present invention relates to a mobile terminal comprising Multiple-Input-Multiple-Output (MIMO) antennas configured for both Single User and Multi User Multiple-Input-Multiple-Output (SU-MIMO and MU-MIMO) signaling modes wherein the mobile terminal comprises means for switching between the modes, the modes having partly shared signaling. The mobile terminal further comprises a receiver means for receiving from the base station information about a reinterpretation of redundant SU-MIMO bits. By using the receiver means, the mobile terminal also receives signaling information associated with MU-MIMO mode by receiving the reinterpreted redundant bits. There is also means for interpreting the reinterpreted redundant bits using the information about the reinterpretation of redundant SU-MIMO bits.

The invention has the advantage of enabling simpler implementation and fewer options in the communication system. The latter is particularly important for facilitating testing that equipment complies with standard. By possibly using codebook subset restriction in combination with intentionally scheduling several terminals or UEs on the same physical resources (resource elements), MU-MIMO can be efficiently supported, at least for SDMA (Space Division Multiple Access) and correlated antenna arrays, when the terminals or UEs are informed of the power offset between the power reference and own data symbols.

DESCRIPTION OF EXAMPLE EMBODIMENTS

The foregoing and other objects, features and advantages of the invention will be apparent from the following detailed description of preferred embodiments.

The present invention relates to a cellular telecommunication system as illustrated in FIG. 1. The present invention sets forth a method and arrangements for Multi User Multiple-Input-Multiple-Output signaling in a telecommunication system. The basic idea of the present invention is to utilize the fact that MU-MIMO and SU-MIMO share many similarities. However they are currently classified as two quite different modes, but there is a lot to gain from exploiting the commonality between the two modes for reducing the number of signaling options. This would not only mean simpler implementation of transmitters and receivers but it will also facilitate testing of equipment to ensure that it fulfills the standard.

When transmitting in SU-MIMO mode or MU-MIMO mode a precoding matrix needs to be selected by the base station for the transmission. According to 3GPP standard the precoding matrix shall be selected from precoding matrices in a 3GPP Standard code book. Each UE recommends, among the precoding matrixes in the codebook, a subset of precoding matrix from the codebook to be used by the Node B in possible subsequent downlink transmissions. Based on e.g. the antenna configuration of the base station the base station can further confine the precoding matrices selection in the UE to a subset of the precoding matrices in the codebook. This technique is called codebook subset restriction. Using code book subset restriction means that the base station has to signal fewer alternative precoding matrices to the UE from which the UE can recommend one to the base station.

By utilizing the agreed working assumption of codebook subset restriction, almost everything from SU-MIMO mode can be reused for MU-MIMO mode as long as it is not explicitly forbidden to schedule multiple terminals or UEs on the same physical resource. One thing that needs to be added to the MU-MIMO mode is informing the UE at a fast rate about the previously mentioned power offset between its data symbols and the power reference. This minor modification seems at least sufficient for SDMA for correlated antenna arrays and a number of related setups. An alternative to signaling the power offset to the UEs is to signal the total number of multiplexed UEs.

The present invention adds support for MU-MIMO mode signaling such as power offset signaling by utilizing SU-MIMO signaling (i.e. bits) that is not needed for MU-MIMO operation and letting them be re-interpreted as MU-MIMO mode signaling information such as the power offset signaling. Note that the signaled power offset can be relative to other varying power offset levels such as data to pilot power ratios and/or measurement power offsets. The transmission rank, i.e. the number of transmitted layers is one example of such unused SU-MIMO signaling since the MU-MIMO mode only needs to support a limited transmission rank per UE. Bits used for precoding matrices not needed because of e.g. application of codebook subset restriction can also be reused/reinterpreted.

Taking four transmitting antennas at the NodeB as an example, signaling of the transmission rank in SU-MIMO mode requires essentially two bits. The transmission rank is signaled in the downlink whenever the UE is scheduled, i.e. possibly for each sub frame. These bits can be reused when transmitting in MU-MIMO mode to e.g. indicate a four-level power offset instead of the transmission rank. The same or a different granularity between the power offset steps may be used. In the simplest case, the power offsets correspond to the factors ¼, ⅓, ½ and 1 corresponding to four, three, two and one multiplexed UEs respectively. This would for example be applicable to a scenario using Space Division Multiple Access (SDMA) with eight beamformers and a uniform linear array (ULA) having 0.5 wavelength element spacing, since this antenna configuration makes it possible to multiplex up to four UEs on the physical resources.

Similarly, for the case with two transmitting antennas up to two UEs can be multiplexed in MU-MIMO mode and there is hence a need to signal power offset factors ½ and 1. In the case of correlated SDMA, four different beamforming/precoding matrices are typically needed, since the other precoding matrices in the 2 Tx LTE codebook are not relevant for this antenna configuration. The 2 Tx codebook in LTE has totally nine elements, which means that five of the elements never need to be signaled to the UE.

Figure 4:
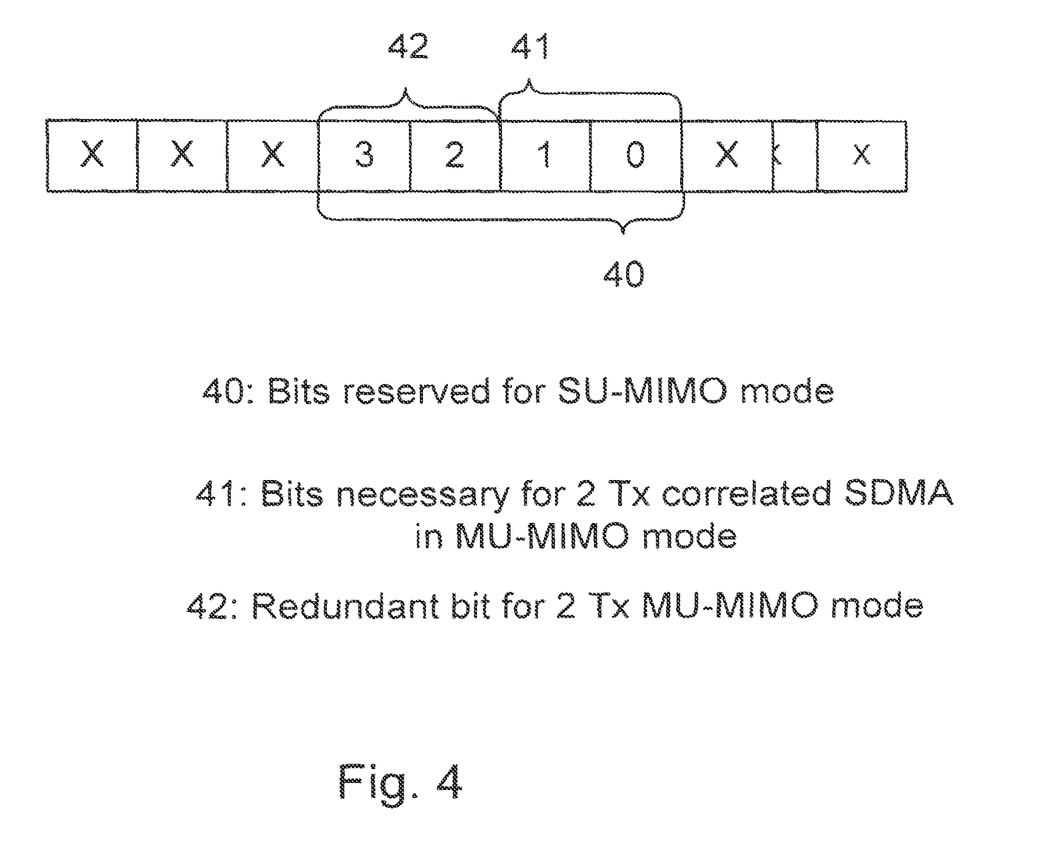
FIG. 4 illustrates bits used for signaling in SU-MIMO mode and MU-MIMO mode.

As illustrated in FIG. 4 four bits 40 are reserved in SU-MIMO mode for signaling from the base station to the UE which precoding matrix that the UE should choose from. In the case of MU-MIMO mode only two bits 41 are needed for signaling to the UE which precoding matrix that the UE should choose from. In MU-MIMO mode the two bits 42 are therefore redundant and may therefore be used to signal the power offset to the UE.

A 4 Tx NodeB antenna setup divided into two pairs of cross-polarized antennas is another important scenario that may be beneficial for MU-MIMO operation. If the antenna pairs are spaced 0.5 wavelengths apart, it is possible to perform correlated beamforming to separate the users and to utilize the two orthogonal polarizations for supporting up to two layer transmission for each UE. The 4 Tx SU-MIMO codebook has been concluded in the LTE standardization process, to contain 16 elements per transmission rank (number of transmitted layers). A minimal codebook for MU-MIMO in the considered setup would need four precoder elements when implementing 2 Tx beamforming on each polarization for single layer transmission and two precoder elements for dual layer transmission. For single rank transmission, a two bit power scaling offset is needed while for dual layer transmission, only a single bit power scaling is needed. This leads to a total of 4*4+2*2=20 combinations, which fit well into the 64 different combinations of precoder elements and rank in the current SU-MIMO codebook. The power offset may be combined with other, possibly dynamically varying, power offsets to form the overall power ratio.

Figure 5:
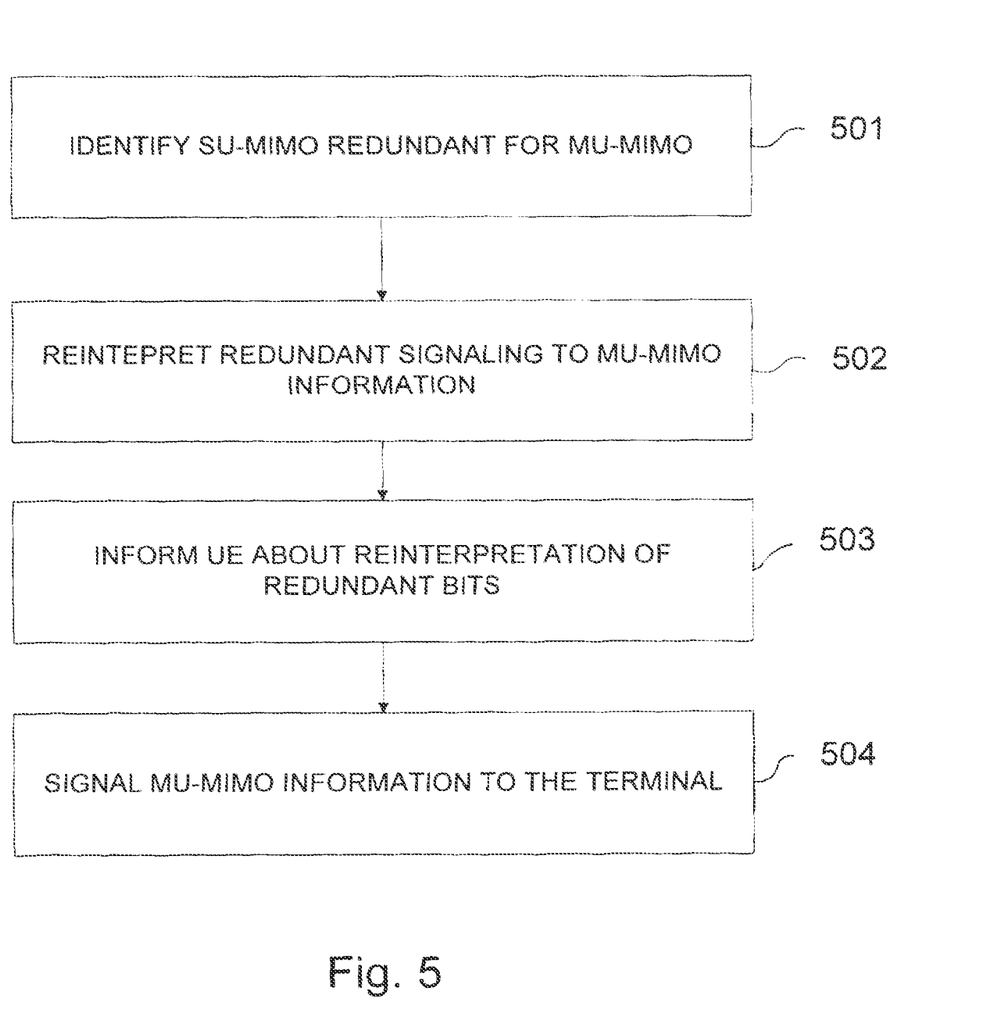
FIG. 5 illustrates a method according to embodiments of the present invention.

Referring to FIG. 5, one aspect of the present invention relates to a method in a radio base station in a communication system for Multi User Multiple-Input-Multiple-Output (MU-MIMO) signaling via Multiple-Input-Multiple-Output (MIMO) antennas between the base station and one of a plurality of multiplexed mobile terminals supporting both Single User and Multi User Multiple-Input-Multiple-Output (SU-MIMO and MU-MIMO) signaling modes. The MU-MIMO modes can for instance be SDMA, zero-forcing beamforming or per user unitary rate control (PU2RC). The communication system supports switching between the modes which also have partly shared signaling. The method, which is shown in the flowchart in FIG. 5, comprises the steps of: (501) identify SU-MIMO mode signaling which is redundant, i.e. not needed, for a MU-MIMO mode signaling; (502) re-interpret or re-define bits i.e. data bits, of the identified redundant signaling to comprise signaling information, associated with MU-MIMO mode; (503) inform the UE about the reinterpretation of the redundant bits; and (504) signal information associated with MU-MIMO mode by using said reinterpreted redundant bits.

In one embodiment of the method according to the present invention, the redundant SU-MIMO mode signaling relates to transmission rank signaling and precoder element signaling. According to one embodiment of the method according to the present invention the identified redundant SU-MIMO mode signaling information is reinterpreted to comprise a power offset between a power reference and data symbols of said one terminal. The power reference can for instance be reference symbols. The identified redundant signaling information can also in another embodiment be reinterpreted to comprise the total number of the multiplexed terminals. The reinterpreted MU-MIMO mode bits may be signaled whenever the terminal is scheduled.

Figure 6:
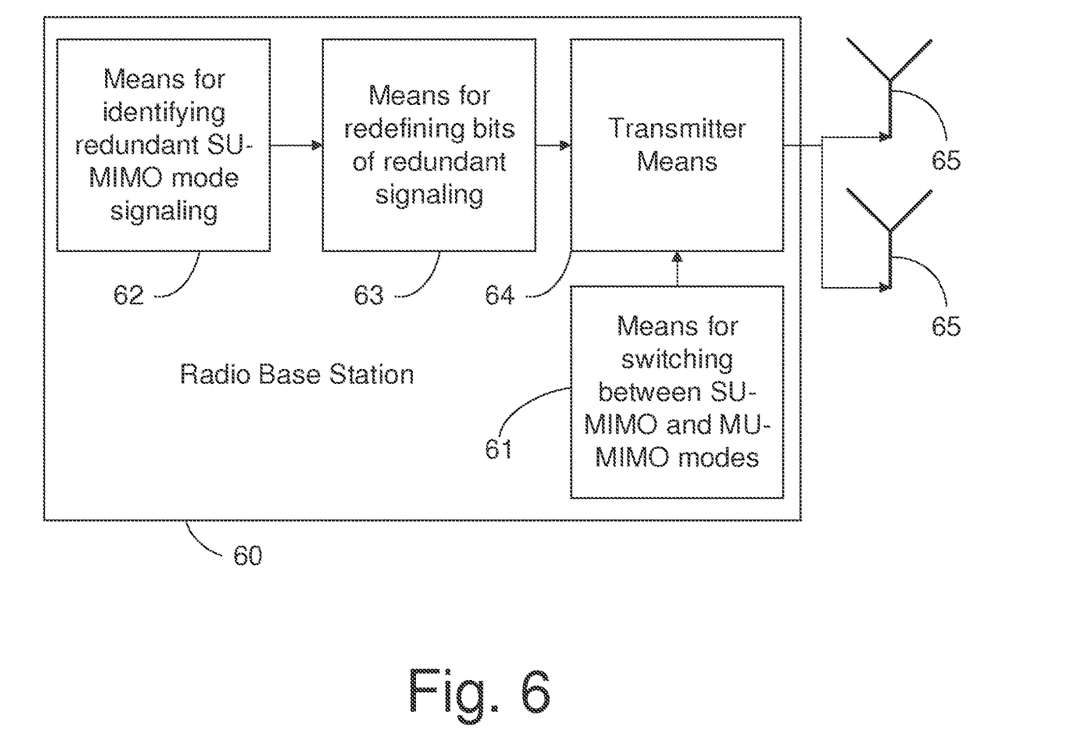
FIG. 6 illustrates a base station according to embodiments of the present invention.

Another aspect of the present invention relates to a radio base station 60 in a communication system. The base station 60, which is shown in FIG. 6. has Multiple-Input-Multiple-Output (MIMO) antennas 65 for enabling signaling to at least one of a plurality of multiplexed mobile terminals (not shown) and supports both Single User and Multi User Multiple-Input-Multiple-Output (SU-MIMO and MU-MIMO) signaling modes. The modes may be SDMA for correlated antenna arrays setups, zero-forcing beamforming or per user unitary rate control (PU2RC) or other MU-MIMO modes. The base station further comprises means 61 for switching between said modes and signaling mode comparator means 62 for identifying redundant SU-MIMO mode signaling that can be reinterpreted to be used with MU-MIMO mode. The redundant SU-MIMO mode signaling can for instance relate to transmission rank signaling and/or precoder element signaling. The radio base station 60 also has reinterpreting means 63 for redefining bits of the redundant signaling to comprise signaling information, associated with the MU-MIMO mode. The MU-MIMO signaling information may comprise a power offset between a power reference (e.g. reference symbols (RS)) and the power used to transmit data symbols. Alternatively the MU-MIMO signaling information comprises the total number of multiplexed terminals. The base station also comprises transmitter means 64 for informing the UE about the reinterpretation of the redundant bits and signaling information associated with MU-MIMO mode by using the reinterpreted redundant bits. The MU-MIMO mode signaling information could for instance be the power offset or the number of terminals that are multiplexed on the physical resource.

Figure 7:
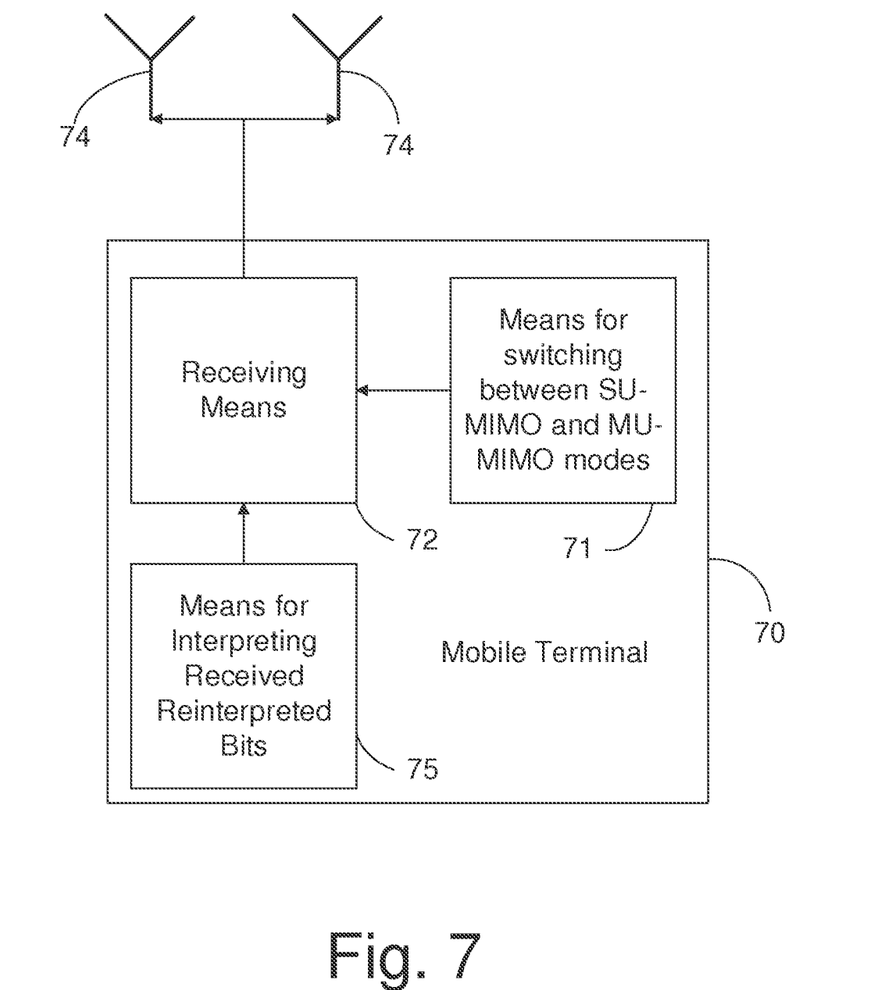
FIG. 7 illustrates a mobile terminal according to embodiments of the present invention.

Yet another aspect of the present invention relates to mobile terminal 70. The mobile terminal 70, which is shown in FIG. 7, has Multiple-Input-Multiple-Output (MIMO) antennas 74 and supports both Single User and Multi User Multiple-Input-Multiple-Output (SU-MIMO and MU-MIMO) signaling modes. The modes may be SDMA for correlated antenna arrays setups, zero-forcing beamforming or per user unitary rate control (PU2RC) or other MU-MIMO modes. The mobile terminal 70 further comprises means 71 for switching between the modes. Redundant SU-MIMO mode signaling can for instance relate to transmission rank signaling and/or precoder element signaling. Receiver means 72 is also provided in the mobile terminal 70 for receiving from a base station (not shown) information about a reinterpretation of redundant SU-MIMO bits. The receiver means 72 is further configured to receive signaling information associated with MU-MIMO mode by receiving the reinterpreted redundant bits. The MU-MIMO signaling information may comprise a power offset between a power reference (e.g. reference symbols (RS)) and the power used to transmit data symbols. Alternatively, the MU-MIMO signaling information may comprise the total number of multiplexed terminals. The mobile terminal also comprises means 75 for interpreting the received reinterpreted redundant bits using the information about the reinterpretation of redundant SU-MIMO bits.

The invention herein disclosed provides significant advantages by proposing a way for supporting MU-MIMO by reusing as much as possibly of the signaling functionality from SU-MIMO mode. By using codebook subset restriction in combination with intentionally scheduling several UEs on the same physical resources (resource elements). MU-MIMO can be efficiently supported, at least for SDMA and correlated antenna arrays, when the UEs are informed at a high rate about the power offset between the power reference and own data symbols.

The invention is however not limited to SDMA and correlated antenna arrays as it may be applicable regardless of MU-MJMO mode.

The high reuse of signaling enables simpler implementation and provides fewer options in the system. The latter is particularly important for facilitating testing that equipment complies with standard.

Note that although terminology from 3GPP LTE has been used in this disclosure to exemplify the invention, this should not be seen as limiting the scope of the invention to only the aforementioned system. Other wireless systems may also benefit from exploiting the ideas covered within this disclosure. Furthermore, the invention is not necessarily restricted to downlink as it may be applicable for uplink transmission techniques as well.

Means mentioned in the present description can be software means, hardware means or a combination of both.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

What is claimed is:

1. A method of signaling a mobile terminal from a base station, the mobile terminal being operable in a Single User Multiple-Input-Multiple-Output (SU-MIMO) mode and a Multi User Multiple-Input-Multiple-Output (MU-MIMO) mode, the method comprising:
    identifying at least one SU-MIMO signaling bit associated with SU-MIMO signaling that is not needed in the MU-MIMO mode;
    redefining the at least one SU-MIMO signaling bit to be at least one MU-MIMO signaling bit associated with MU-MIMO signaling;
    informing the mobile terminal about the redefinition of the at least one SU-MIMO signaling bit as the at least one MU-MIMO signaling bit; and
    signaling the mobile terminal in the MU-MIMO mode using the at least one MU-MIMO signaling bit.

2. The method of claim 1, wherein the SU-MIMO mode and the MU-MIMO mode have partly shared signaling.

3. The method of claim 1, wherein the at least one SU-MIMO signaling bit is associated with transmission rank signaling and/or precoder element signaling in the SU-MIMO mode.

4. The method of claim 1, wherein the at least one MU-MIMO signaling bit is associated with a downlink power offset in the MU-MIMO mode.

5. The method of claim 4, wherein the power offset is between a power reference and data symbols.

6. The method of claim 5, wherein said power reference is reference symbols (RS).

7. The method of claim 1, comprising signaling the mobile terminal in the MU-MIMO mode using the at least one MU-MIMO signaling bit whenever the mobile terminal is scheduled.

8. A base station comprising:
    Multiple-Input-Multiple-Output (MIMO) antennas for signaling a mobile terminal;
    a processor configured to:
        identify at least one SU-MIMO signaling bit associated with SU-MIMO signaling that is not needed in the MU-MIMO mode; and
        redefine the at least one SU-MIMO signaling bit to be at least one MU-MIMO bit associated with MU-MIMO signaling;
    a transmitter configured to:
        inform the mobile terminal about the redefinition of the at least one SU-MIMO signaling bit as the at least one MU-MIMO bit; and
        signal the mobile terminal in the MU-MIMO mode using the at least one MU-MIMO signaling bit.

9. The base station of claim 8, wherein the SU-MIMO mode and the MU-MIMO mode have partly shared signaling.

10. The base station of claim 8, wherein the at least one SU-MIMO signaling bit is associated with transmission rank signaling and/or precoder element signaling in the SU-MIMO mode.

11. The base station of claim 8, wherein the at least one MU-MIMO signaling bit is associated with a downlink power offset in the MU-MIMO mode.

12. The base station of claim 11, wherein the power offset is between a power reference and data symbols.

13. The base station of claim 11, wherein said power reference is reference symbols (RS).

14. The base station of claim 8, wherein the transmitter is configured to signal the mobile terminal in the MU-MIMO mode using the at least one MU-MIMO signaling bit whenever the mobile terminal is scheduled.

15. A method for a mobile terminal operable in a Single User Multiple-Input-Multiple-Output (SU-MIMO) mode and a Multi User Multiple-Input-Multiple-Output (MU-MIMO) mode, the method comprising the steps of:
    receiving information from a base station, the information redefining at least one SU-MIMO signaling bit to be at least one MU-MIMO bit associated with MU-MIMO signaling, the at least one SU-MIMO signaling bit having been identified by the base station as being associated with SU-MIMO signaling that is not needed in the MU-MIMO mode;
    receiving at least one MU-MIMO signaling bit in the MU-MIMO mode; and interpreting the at least one MU-MIMO signaling bit in the MU-MIMO mode based on the received information.

16. The method of claim 15, wherein the SU-MIMO mode and the MU-MIMO mode have partly shared signaling.

17. The method of claim 15, wherein the at least one SU-MIMO signaling bit is associated with transmission rank signaling and/or precoder element signaling in the SU-MIMO mode.

18. The method of claim 15, wherein the at least one MU-MIMO signaling bit is associated with a downlink power offset in the MU-MIMO mode.

19. The method of claim 18, wherein the power offset is between a power reference and data symbols.

20. The method of claim 19, wherein said power reference is reference symbols (RS).

21. The method of claim 15, comprising receiving the at least one MU-MIMO signaling bit in the MU-MIMO mode whenever the mobile terminal is scheduled.

22. A mobile terminal configured to operate in a Single User Multiple-Input-Multiple-Output (SU-MIMO) mode and a Multi User Multiple-Input-Multiple-Output (MU-MIMO) mode, the mobile terminal comprising:
 a receiver configured to receive from a base station:
  information redefining at least one SU-MIMO signaling bit to be at least one MU-MIMO bit associated with MU-MIMO signaling, the at least one SU-MIMO signaling bit having been identified by the base station as being associated with SU-MIMO signaling that is not needed in the MU-MIMO mode, and
  the at least one MU-MIMO signaling bit in the MU-MIMO mode; and
 a processor configured to interpret the at least one MU-MIMO signaling bit in the MU-MIMO mode based on the received information.

23. The mobile terminal of claim 22, wherein the SU-MIMO mode and the MU-MIMO mode have partly shared signaling.

24. The mobile terminal of claim 22, wherein the at least one SU-MIMO signaling bit is associated with transmission rank signaling and/or precoder element signaling in the SU-MIMO mode.

25. The mobile terminal of claim 22, wherein the at least one MU-MIMO signaling bit is associated with a downlink power offset in the MU-MIMO mode.

26. The mobile terminal of claim 25, wherein the power offset is between a power reference and data symbols.

27. The mobile terminal of claim 26, wherein said power reference is reference symbols (RS).

28. The mobile terminal of claim 22, wherein the receiver is configured to receive the at least one MU-MIMO signaling bit in the MU-MIMO mode whenever the mobile terminal is scheduled.

* * * * *